Sept. 22, 1970 G. L. BELL 3,529,685
AUTOMATIC WEIGHING MACHINE
Filed Aug. 6, 1968 4 Sheets-Sheet 2

United States Patent Office 3,529,685
Patented Sept. 22, 1970

3,529,685
AUTOMATIC WEIGHING MACHINE
Geoffrey Lloyd Bell, 240 Grand Promenade, Dianella,
Western Australia, Australia
Filed Aug. 6, 1968, Ser. No. 750,739
Claims priority, application Australia, Aug. 11, 1967,
25,840/67
Int. Cl. G01g 13/24
U.S. Cl. 177—107                          10 Claims

ABSTRACT OF THE DISCLOSURE

An automatic weighing machine for repeatedly weighing a predetermined amount of flowable material such as poultry feed having a hopper into which the flowable material is fed, said hopper being pivotally mounted for rotation about a substantially horizontal axis adjacent the lower end of the hopper and remote from the centre of gravity thereof. The flow of material into and out of the hopper is controlled by electrically operated elements.

---

This invention relates to an automatic weighing machine and more particularly to a weighing machine for performing periodically repeated weighings of a predetermined quantity of powdered, granular or other flowable materials. It is particularly applicable to the weighing of predetermined amounts of poultry feed into a poultry chain feeder wherein the poultry feed is carried along in troughs by means of an endless scraper chain.

According to the present invention there is provided an automatic weighing machine for repeatedly weighing a predetermined amount of flowable material, comprising a hopper pivotally mounted for limited rotation about a substantially horizontal axis located adjacent the lower end of the hopper and remote from the centre of gravity of the hopper so that said hopper will tilt when said predetermined amount of flowable material is contained therein, said hopper having an inlet for said flowable material and an outlet, closure means for said inlet, said closure means being adapted to be held in an open position by the actuation of an electrically operated control element, the closure means being biased to a closed position when said control element is not actuated said control element being connected in an electrical circuit with normally closed first and second switch means, said first switch means being moved to an open position upon tilting movement of said hopper, thus actuating said control element to operate the closure means to cut off the supply of flowable material to said hopper, said outlet being provided with a counter-balanced hinged flap arranged to be locked in a position to close said outlet when said inlet is open said second switch means being operatively associated with said flap so that when said flap is in position to close said outlet, said second switch means is closed and when said outlet is open said second switch means is open.

Preferably said control element is operatively connected to a totaliser which operates each time the inlet is opened.

In order however, that the invention may be more clearly understood it will now be described with reference to the accompanying drawings but it will be appreciated that the invention is not limited to this particular embodiment.

Figure 1:
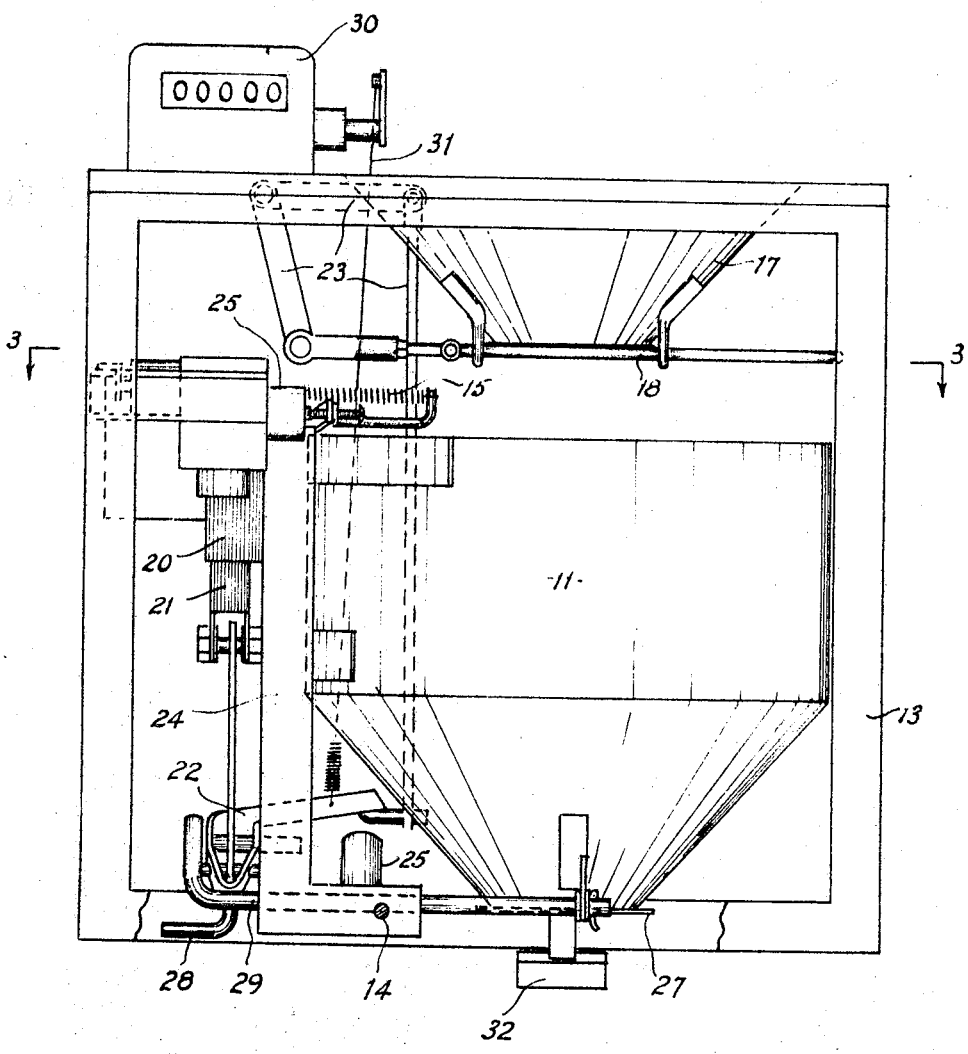
Figure 2:
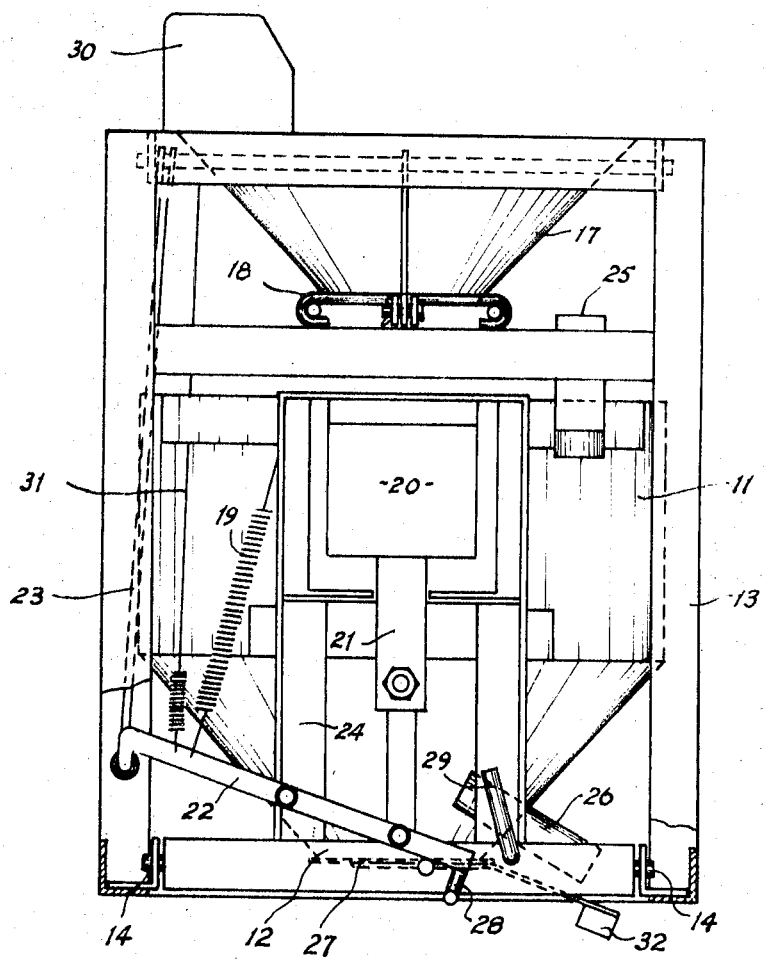
Figure 3:
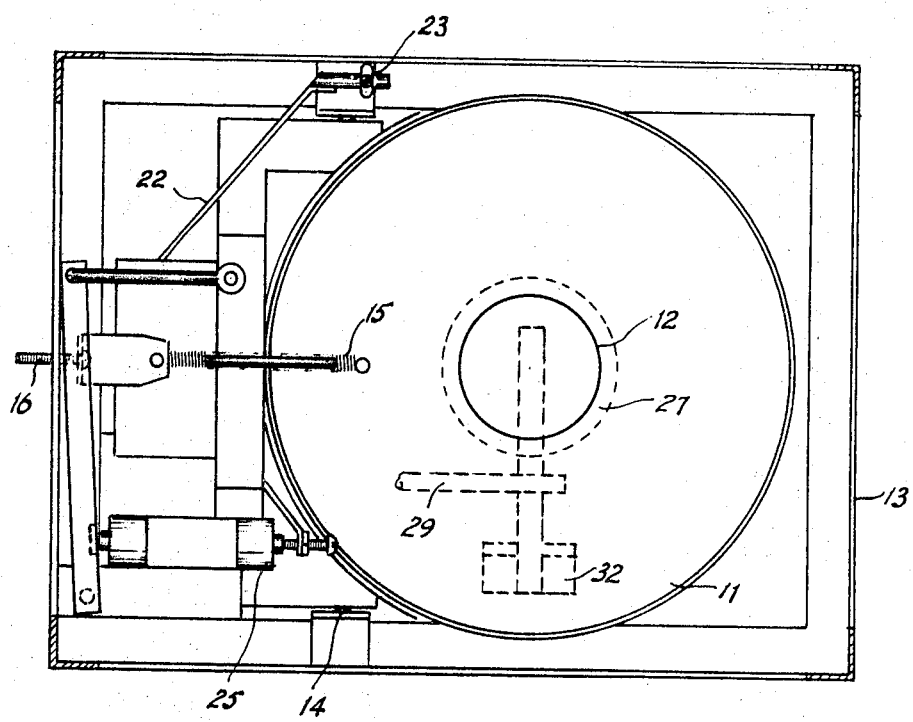
Figure 4:
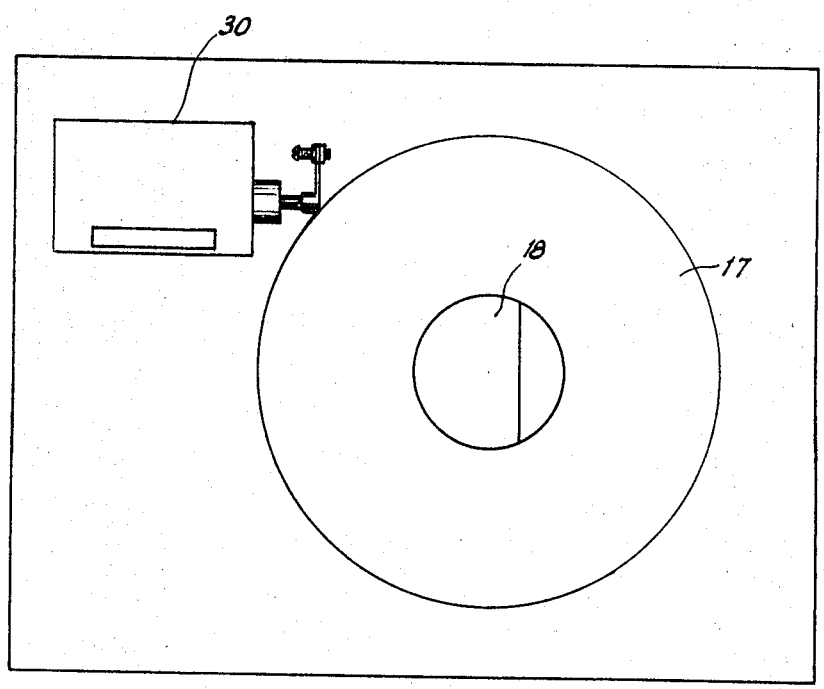
Figure 5:
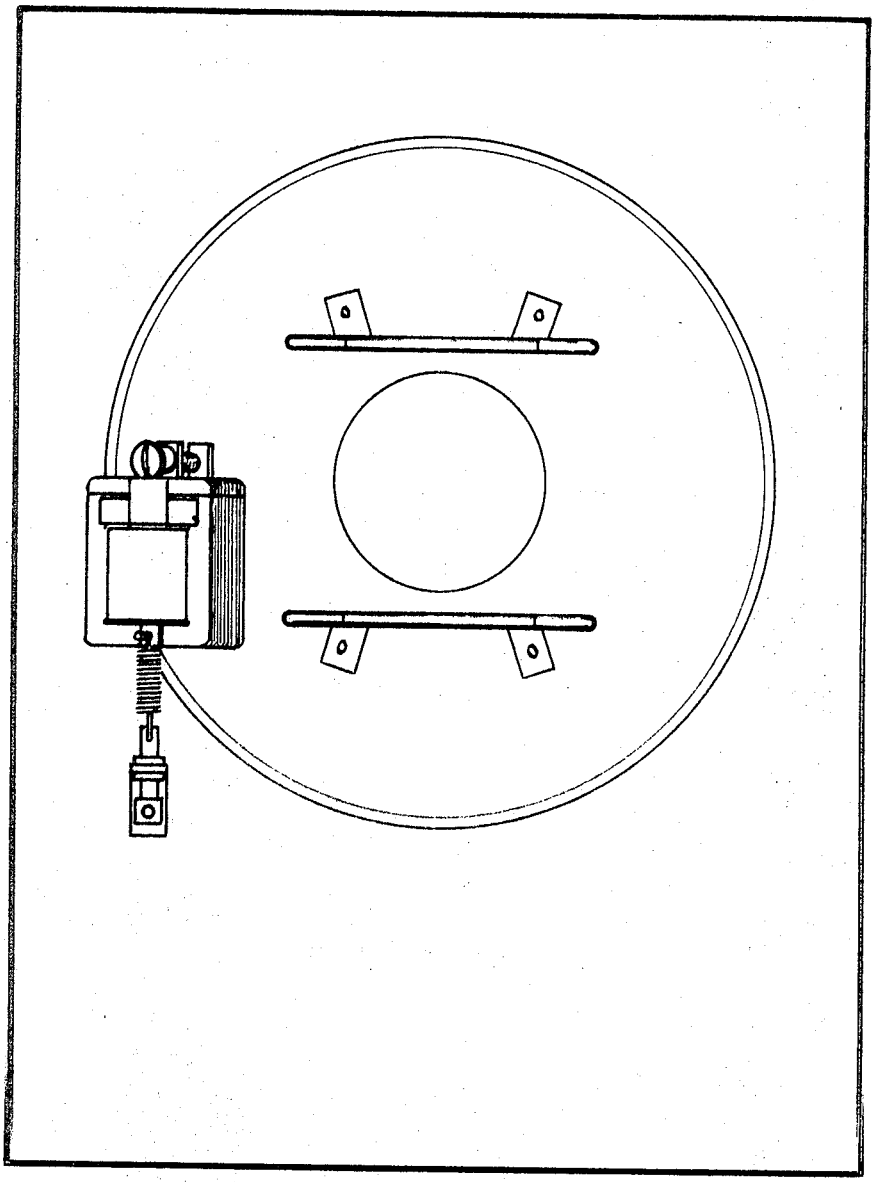

In the drawings:
FIG. 1 is a front elevation of the embodiment;
FIG. 2 is a side elevation of the embodiment;
FIG. 3 is a sectional plan along the line 3—3 of FIG. 1;
FIG. 4 is a plan view of the embodiment; and
FIG. 5 is an inverted plan view of the chute fitted with a vibrator.

The weighing machine of the present embodiment is devised especially for feeding predetermined amounts of poultry feed in powder or granular form to poultry feed troughs. The weighing machine generally comprises a substantially cylindrical hopper 11 the lower portion of the walls thereof tapering inwardly to an outlet 12. The hopper 11 is connected to a substantially horizontal shaft 14 which is pivotally mounted in a suitable framework 13 for limited rotation about a substantially horizontal axis. The shaft 14 is located adjacent the lower end of the hopper at a point distant from the centre of gravity of the hopper 11 so that the hopper is in an inherently unstable condition and will tilt readily when a predetermined quantity of material has been placed in the hopper. The hopper 11 is held in a vertical or upright position by means of a spring 15 one end of which is attached to the wall of the hopper the other end of the spring being attached to an adjusting screw 16 mounted on the framework 13, such that adjustment of the screw 16 allows variations to be made in the tension of the spring 15. By varying the tension on the spring 15 varying amounts of material can be fed into the hopper 11 before it tilts to an inclined position, against the action of the spring 15. The upper end of the hopper 11 is located below a discharge chute 17 from a main storage bin (not shown), the end of the chute 17 being provided with a sliding closure plate 18, which when the machine is not in use is biased by spring means 19 to close off the chute 17 to prevent supply of material to the hopper 11.

The closure plate 18 is arranged to be operated by a solenoid 20, the plunger rod 21 of the solenoid being connected to one end of a lever arm 22, the other end of the lever arm being connected through suitable linkages 23 to the closure plate, the lever arm 22 being pivotally mounted about a point intermediate its ends on a bracket member 24 attached to the wall of the hopper 11 for rotation in a substantially vertical plane. To ensure that the tilting movement of the hopper does not interfere with the operation of the closure plate 18 it is desirable that the connection between the lever arm 22 and the link 23 should be located adjacent to the pivotal axis of the hopper. The spring means 19 extends between the lever arm 22 and the bracket member 24. The solenoid 20 is connected in an electrical circuit in series with a normally closed micro-switch 25 attached to the framework 13 and a mercury switch 26. When the hopper 11 contains the predetermined quantity of material it tilts and thus opens the micro-switch 25 to break the circuit. Preferably the micro-switch 25 is of the maintain contact type so that chattering is substantially eliminated. The solenoid 20 which is then de-energised releases the closure plate 18 which is biased by the spring 19 to cut off the supply of material to the hopper 11.

If the material is of the type that does not flow readily such as poultry mash the discharge chute may be fitted with vibrating means. For example as shown in FIG. 5 of the drawings a solenoid 40 is fixed to the underside of the chute 17. The faces of the solenoid are prevented from closing by means of a coiled spring 41 the tension on the spring being adjusted by a screw 42. The solenoid is incorporated in the electrical circuit of the machine so that it operates when the closure plate 18 is open. The amplitude of the vibration is controlled by varying the tension on the spring 41. Instead of being coupled to a spring the solenoid may be made to vibrate by passing the electric current to the solenoid through a rectifier which produces a series of pulses of current.

The outlet 12 at the bottom of the hopper is provided with a counter-balanced flap 27 which is locked in a closed position when the closure plate 18 is open. The flap 27 is locked in position by means of a locking rod 28 projecting from an end of the lever arm 22, the locking rod bearing against a bend formed at the end of a latching bar 29 about which the flap 27 rotates, when the solenoid is actuated. When the solenoid is de-energised the flap 27 swings open due to the weight of the material supported thereon. The mercury switch 26 is mounted for rotation with the flap 27, the switch 26 being closed when the outlet 12 is closed and open when the outlet is open. Thus when both the micro-switch 25 and the mercury switch 26 are closed, the solenoid 20 is actuated and the material flows into the hopper 11.

If desired a totaliser 30 may be connected through an extensible linkage 31 to the lever arm 22 so that it registers each time the solenoid 20 operates, that is, each time the closure plate 18 is opened. Thus by a simple calculation the amount of material which has been delivered to the hopper may be readily estimated. If desired the totaliser 30 may be replaced by a predetermining counter provided with a micro-switch incorporated in the electrical circuit of the machine. The predetermining counter can be set so that after a predetermined quantity of material has been weighed the micro-switch will open to intercept the circuit and stop further operation of the machine.

In operation material is fed into the hopper until the required amount is contained therein. The hopper tilts under the action of the weight of the material and immediately the micro-switch 25 is caused to move to its open position. The solenoid 20 as a result is de-energised and the closure plate 18 moves across under the action of the spring 19 to close the inlet. The outlet flap 27 is then released and it swings open under the weight of the material in the hopper 11. When the flap moves to open the outlet 12 the mercury switch 26 is caused to move to the open position. As the material passes out through the outlet 12, the hopper 11 under the action of the biasing spring 15 returns to its upright position causing the micro-switch 25 to close. The mercury switch 26 is however still in the open position and remains there until all the material has passed from the hopper 11 at which time the outlet flap 27 under the influence of the counterweight 32 causes the outlet 12 to be closed thus, allowing the mercury switch 26 to return to its closed position to complete the electrical circuit and allow the now energised solenoid 20 to cause the outlet flap 27 to be locked in a closed position and to cause the closure plate 18 to open to let material flow into the hopper 11.

It will be clear from the foregoing that the position of the outlet flap 27 controls the operation of the machine. If the material discharged from the hopper is not carried away it will remain in a substantially inverted conical pile below the hopper and prevent the closure flap 27 from returning to its closed position. When the pile diminishes the closure flap 27 will move to the closed position to initiate another cycle of weighing as described above. The aspect of the machine is of particular advantage when the machine is coupled with a poultry chain feeder. The automatic weighing machine can be made compact so that it can be fitted into the normally small space available between the top of the hopper of the feeder and the conveyor chain.

I claim:

1. An automatic weighing machine for repeatedly weighing a predetermined amount of flowable material, comprising a hopper pivotally mounted for limited rotation about a substantially horizontal axis located adjacent the lower end of the hopper and remote from the centre of gravity of the hopper so that said hopper will tilt when said predetermined amount of flowable material is contained therein, said hopper having an inlet for said flowable material and an outlet, closure means for said inlet, said closure means being adapted to be held in an open position by actuation of an electrically operated control element, the closure means being biased to a closed position when said control element is not actuated, said control element being connected in an electrical circuit with normally closed first and second switch means, said first switch means being moved to an open position upon tilting movement of said hopper, thus actuating said control element to operate the closure means to cut off the supply of flowable material to said hopper, said outlet being provided with a counter-balanced hinged flap arranged to be locked in a position to close said outlet when said inlet is open, said second switch means being operatively associated with said flap so that when said flap is in position to close said outlet, said second switch means is closed, and when said outlet is open said second switch means is open.

2. An automatic weighing machine as claimed in claim 1 wherein said control element is operatively connected to a totaliser which operates each time the inlet is opened.

3. An automatic weighing machine as claimed in claim 1 wherein said control element is a solenoid.

4. An automatic weighing machine as claimed in claim 1 wherein said first switch means is a microswitch.

5. An automatic weighing machine as claimed in claim 1 wherein said second switch means is a mercury switch.

6. An automatic weighing machine as claimed in claim 1 wherein the inlet is fitted with vibrating means.

7. An automatic weighing machine for repeatedly weighing a predetermined amount of flowable material comprising a hopper pivotally mounted for limited rotation about a substantially horizontal axis located adjacent the lower end of the hopper and remote from the centre of gravity of the hopper so that the hopper will tilt when said predetermined amount of flowable material is contained therein; spring means for holding said hopper in a substantially vertical position; a chute through which said material flows into said hopper; a sliding closure plate for said chute; an electrically operated control element coupled to said closure plate for holding said closure plate open when said control element is actuated, said closure plate being biased to the closed position when said control element is not actuated; first and second switch means being connected in an electrical circuit with said control element, said switch means being normally closed and said first switch means being connected to said hopper so that it opens when said hopper tilts; and a counter balanced hinged flap for closing the discharge end of the hopper, said second switch means being coupled to said hinged flap so that when said flap is in the closed position said second switch means is closed and when said flap is open said second switch means is open.

8. An automatic weighing machine as claimed in claim 7 wherein said spring means for holding said hopper in a substantially vertical position is coupled to an adjusting screw.

9. An automatic weighing machine as claimed in claim 7 wherein said control element is a solenoid, said first switch means is a maintain contact micro switch and said second switch means is a mercury switch.

10. An automatic weighing machine as claimed in claim 9 wherein the plunger rod of the solenoid is pivotally connected to one end of a lever arm the other end of which is coupled to one end of a link member the other end of which is coupled to said sliding closure plate, the connection between said lever arm and said link member being located adjacent the pivotal axis of said hopper.

References Cited

UNITED STATES PATENTS

| 403,189 | 5/1889 | Henry | 177—107 |
|---|---|---|---|
| 431,140 | 7/1890 | Day | 177—109 |
| 867,745 | 10/1907 | McLeod | 177—107 |

FOREIGN PATENTS

| 695,608 | 8/1940 | Germany. |
|---|---|---|
| 75,605 | 9/1949 | Norway. |

RICHARD B. WILKINSON, Primary Examiner

G. H. MILLER, Jr., Assistant Examiner